United States Patent
Kaltner

Patent Number: 6,034,604
Date of Patent: Mar. 7, 2000

[54] DEACTIVATION PREVENTION FOR ELECTRONIC ARTICLE SURVEILLANCE SYSTEMS

[76] Inventor: George Kaltner, 1256 N. Church St. Suite A, Moorestown, N.J. 08057

[21] Appl. No.: 09/231,889

[22] Filed: Jan. 14, 1999

[51] Int. Cl.[7] .................................................. G08B 13/14
[52] U.S. Cl. .................................. 340/572.3; 340/572.1; 340/825.54; 455/127
[58] Field of Search ............................ 340/572.3, 572.1, 340/505, 825.54, 571, 539; 342/32, 30, 82; 455/127, 31.1, 37.1

[56] References Cited

U.S. PATENT DOCUMENTS 5,613,228 3/1997 Tuttle et al. ........................... 455/127
5,751,223 5/1998 Turner ................................ 340/825.54

*Primary Examiner*—Benjamin C. Lee
*Attorney, Agent, or Firm*—Norman E. Lehrer

[57] ABSTRACT

A method is disclosed for incorporation into an electronic article surveillance (EAS) detection system, which essentially eliminates the unintended deactivation of deactivatable target labels. The disclosed method, when properly implemented, offers no degradation to the detection range or responsiveness of the EAS system to deactivatable or non-deactivatable targets. Although primarily intended for pulsed resonant frequency RF EAS systems, the disclosed method of eliminating unintended deactivation is fully applicable to any field-generating RF EAS detection system.

8 Claims, 1 Drawing Sheet

DEACTIVATION PREVENTION FOR ELECTRONIC ARTICLE SURVEILLANCE SYSTEMS

BACKGROUND OF THE INVENTION

Radio frequency RF resonant systems have been employed for many years for anti-pilferage purposes. Such systems are commonly referred to as electronic article surveillance or EAS systems. The most popular type of EAS system which is typical of the industry is the swept RF system, consisting of a transmitter and receiver and their associated antennas. The swept system uses a transmitter that is FM modulated, typically with a low frequency sinusoidal sweep signal, and that transmits continuously. The receiver, spaced some distance away, continuously monitors the swept signal that is radiated within the detection zone. A resonant circuit on a tag or the like introduced into the detection zone produces a periodic (synchronous with the sweep frequency) distortion that is detected by the receiver and triggers an alarm. These systems are also referred to as field-disturbance sensors since the resonant circuit disturbs the field within the detection zone.

Another type of EAS system, the pulsed system, typically places the transmitter and receiver into a single antenna structure. The transmitter and receiver may be connected to their own loop antennas within the structure, or they may share a single antenna. In both cases, the antennas can be configured as single or multiple loop, depending upon the specific application. In a pulsed system, the transmitter is not typically FM modulated, nor does it transmit continuously. The transmitter is only on for a very short duration (pulsed) at a periodic rate and a relatively high peak intensity. The receiver looks for any RF energy within the detection zone immediately after each transmitted pulse. This RF energy should be present only if there was a resonant circuit within the detection zone that was excited by the transmitted RF pulse.

The most popular pulsed systems were originally designed to work primarily with reusable "hard tag" RF resonant circuits also known as "targets" or "tags". These targets are made of a coil of wire and a fixed capacitor, encapsulated typically into a molded plastic package. Although popular in certain applications, the "hard tag" is not the primary target used by retailers today.

The most common target today is the printed and etched RF label. Pulsed systems that are designed to operate using the etched label present a new set of challenges that must be overcome. The pulsed system relies upon the bandwidth of the transmitted RF energy pulse to be able to excite any targets produced within their manufacturing tolerances. While the hard tag has a typical frequency tolerance of 2–4% in production, the printed and etched labels may vary in frequency up to 5–7%. Additionally, the printed labels are smaller in size and have a lower "Q" factor than the hard tag. Since the size (bigger is better) and the "Q" factor (higher is better) affects the amount of energy that the target acquires during the transmitted RF energy pulse, overall system performance will suffer significantly when merely substituting the printed label for the hard tag.

The easiest and least expensive method to recover the performance level when using printed labels is to 1) widen the pulsed transmitter spectrum bandwidth by narrowing the transmitted pulse on-time to cover the increased frequency tolerances of the printed labels, and 2) compensate for the lost tag energy due to the decrease in size and "Q" by increasing the transmitted pulse intensity or amplitude.

As if these challenges aren't enough, a major problem can result from using a pulsed system with a deactivatible printed label. Most of the printed and etched tags produced today are processed to be deactivatible. The most common method of deactivating printed labels is by shorting its internal capacitor plates using a relatively low intensity RF energy field. The energy emitted from the antenna of a pulsed system could deactivate deactivatable printed labels up to 10 inches from the antenna. This could seriously impair the merchant from confirming a shoplifting event.

The only time that the EAS system alarm should sound is when a "live" label passes through the detection zone. Normally labels are disabled or "deactivated" at the time of purchase utilizing a separate deactivating device located adjacent the cash register. Should the EAS alarm sound, this is an indication that there is a live tag, either because the patron is shoplifting or the tag was not properly deactivated. Occasionally, the EAS system may also generate a "false" alarm even though the tag has been properly deactivated. A common procedure when an alarm sounds is to ask the suspected shoplifter to walk back through the system. If he has a tagged article that was not purchased legitimately, the alarm should sound again, and the merchant can take whatever action he deems necessary. If, however, the label was deactivated by the transmitter itself shortly after creating the alarm, the merchant can not confirm the event, and the shoplifter would go free.

SUMMARY OF THE INVENTION

The present invention overcomes the deficiencies of the prior art described above and allows the transmitter to operate at full peak intensity for maximum detection distance, while preventing labels from accidentally or intentionally being deactivated. As the label approaches the transmitter antenna, the receiver recognizes the proximity and reduces the transmitter pulse intensity sufficiently to avoid deactivating any labels that get too close, while still allowing the system to recognize and process the label information.

BRIEF DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

DETAILED DESCRIPTION OF THE PREFERRED EMBODIMENT

Figure 1:
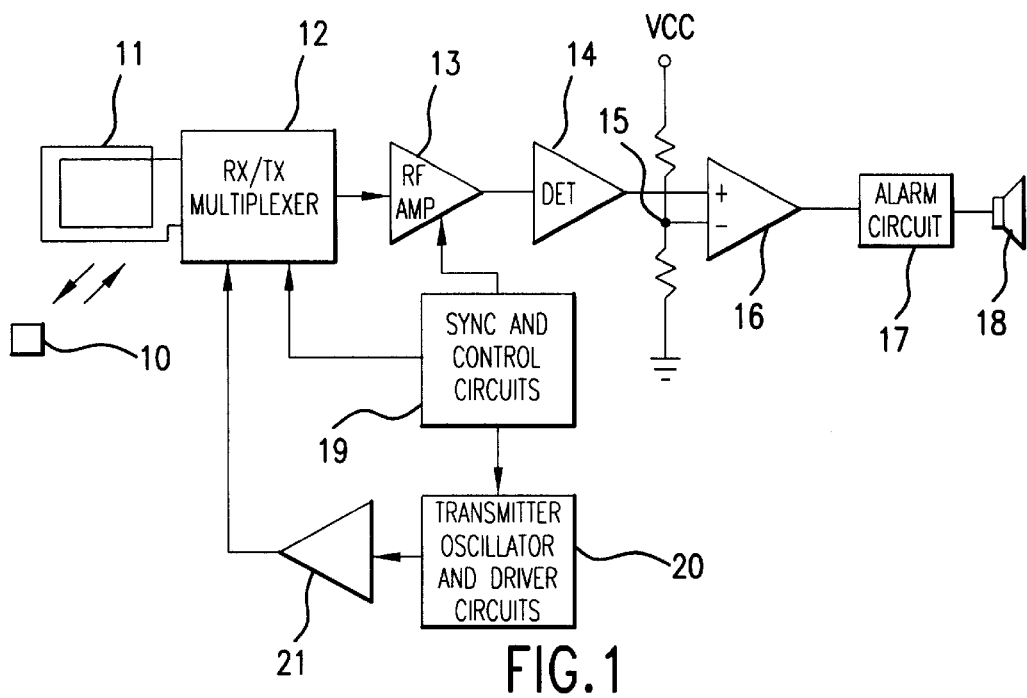
FIG. 1 illustrates in schematic form a block diagram of a typical pulsed radio frequency electronic article surveillance or detection system built in accordance with the prior art.

Referring now to the drawings in detail wherein like reference numerals have been used in the two figures to designate like elements, there is shown in FIG. 1 a typical prior art pulsed RF detection system found in the EAS industry. In FIG. 1, elements 10 to 21 represent the known functional elements of such a typical pulsed RF detection system and does not include elements of the current invention. A brief description of FIG. 1 is necessary, however, so that the improvements of the current invention can be better understood.

Figure 2:
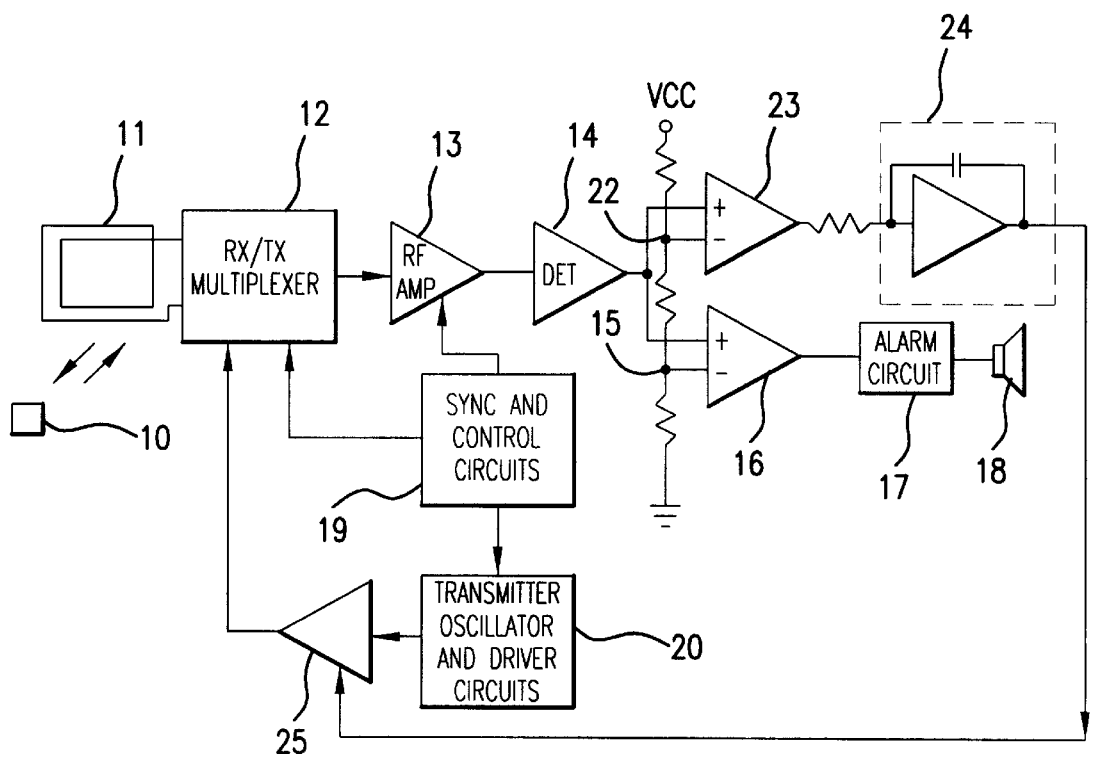
FIG. 2 illustrates in schematic form a block diagram of a pulsed radio frequency electronic article surveillance or detection system similar to the system of FIG. 1 with the added components necessary to implement the current invention.

The particular EAS detection system depicted in FIG. 1 represents a pulsed RF system which is contained in a single pedestal structure. The loop antenna 11 connects to a printed circuit board containing functional items 12 through 21. Those skilled in the art will recognize that the EAS system depicted in FIG. 1 is only one of a number of possible configurations. For example, the receive and transmit electronics could be separated and housed in separate pedestal structures each with its own loop antenna, creating a primary detection zone between the two pedestal structures. As another alternative, the loop antenna design, of either or both the receiver and transmitter, might be a multi-loop far field canceling design using shielded wires in a plastic or wood pedestal. The improvements disclosed in the current invention, and later described and displayed in FIG. 2, are by no means limited to the specific EAS system depicted in FIG. 1, and could easily be implemented in a variety of alternate configurations.

The operation of the EAS detection system depicted in FIG. 1 will now be described. The synchronize and control function 19 creates the timing for both the receive and transmit functions. Periodically, at a rate of typically between 20 HZ to 100 HZ, the transmitter circuits 20 are triggered to produce an RF pulse. This pulse has a center frequency equal to the frequency of the resonant target tag 10 and is shaped to have an "on" time of only about 2.0 micro-seconds. The pulse is amplified by the transmitter RF amplifier 21. The amplified RF pulse reaches the loop antenna 11 through the RX/TX multiplexer 12. The purpose of the multiplexer is to essentially connect the loop antenna to the transmitter during the period that the transmitter is active, and to connect the loop antenna to the receiver RF amplifier 13 during the time period when the receiver is functional. The RX/TX multiplexer 12 is controlled by the synchronization and control circuit 19. The receiver RF amplifier 13 is gated off by the sync and control circuit 19 during the transmitter "on" time to prevent overloading the receive circuits. A short time, 4 to 6 micro-seconds, following the transmitted pulse, the RF amplifier 13 is restored to full gain.

During the transmit pulse, the target resonant tag 10 will receive RF energy at the transmitted frequency. After the transmit pulse is finished, RF currents continue to oscillate in the resonant tag 10 at the tags own resonant frequency. Although the resonant oscillation decays exponentially, it lasts long enough to radiate back to the loop antenna 11 and be passed through the RX/TX multiplexer 12 and amplified by the RF amplifier 13 and detected by the detector 14. Assuming a given resonant tag Q factor and orientation relative to the loop antenna, the primary factor determining the output voltage of the detector is the distance d of the resonant tag from the loop antenna.

At very large distances d, the output of the detector 14 is theoretically zero. As the resonant tag is brought closer to the loop antenna, the detector output voltage increases. At some distance d1, the detection threshold distance, the detector output voltage just exceeds the predetermined tag threshold voltage 15. For tag distances of d1 or less, the detector output exceeds the tag threshold voltage and the tag threshold comparator 16 develops a signal to trigger an alarm circuit 17. The alarm circuit 17, when triggered, drives an audible sounder 18, and possibly also a light or other alarm indicators. As pointed out above, should a live tag be brought too close to the loop antenna, the transmitted energy may deactivate the tag. While this may also trigger the alarm circuit, the event cannot be repeated. Thus, it cannot be determined whether a patron is shoplifting or whether there was simply a false alarm.

FIG. 2 is a block diagram of essentially the same EAS detection system as FIG. 1 with the addition of the functional elements necessary to implement the features of the current invention. The new or modified elements of FIG. 2 will now be set forth. The transmitter RF amplifier 21 of FIG. 1 is replaced with a variable gain transmitter RF amplifier 25 in FIG. 2. The variable gain characteristics of the transmitter RF amplifier in FIG. 2 are such that a control voltage input of +VCC volts provides for 40 db gain and 0 VDC control input voltage corresponds to 0 db gain. Those skilled in the art will recognize that the conversion of the fixed gain RF amplifier 21 in FIG. 1 to the variable gain RF amplifier 25 in FIG. 2 is a relatively straight forward design conversion using electronic linear attenuator control devices such as RF PIN diodes or JFET transistors.

A transmitter level control threshold, 22 of FIG. 2, has been added. This is a fixed predetermined voltage and is purposely set at a voltage which is higher than the tag threshold voltage 15 of FIG. 1. A second voltage comparator 23 of FIG. 2, is added to compare the detector output voltage with the transmitter level control threshold. Lastly, a voltage integrator, 24 of FIG. 2, has been added. This integrator accepts the output of the automatic transmitter level control threshold comparator 23 and directly drives the control input of the variable gain RF amplifier 25. The operation of the added or modified components of FIG. 2 will now be discussed.

Referring to FIG. 2, during a typical shoplifting event a deactivatable resonant RF label 10 is brought from a great distance to a detection threshold distance previously defined as d1. At this distance, approximately 3 feet, the detector 14 output voltage equals or slightly exceeds the tag threshold voltage 15. There is no danger of deactivating the deactivatable label until the label is brought to within about 1 foot from the loop antenna. The automatic transmitter level control threshold 22 is set to equal the detector output voltage corresponding to a deactivatable RF label held at a distance of about 2 feet from the loop antenna. For detection distances where the label is greater than 2 feet from the loop antenna, the system in FIG. 2 behaves exactly like the system in FIG. 1. For distances less than 2 feet, the system in FIG. 2 behaves as a servo-loop with the threshold comparator 23, the voltage integrator 24 and variable gain transmit RF amplifier 25 working to maintain a constant detector output voltage equal to the 2 foot detection voltage. The induced voltage in the deactivatable label in FIG. 2 theoretically never exceeds the voltage that is induced at the 2 foot distance regardless of how close it comes to the loop antenna. Note that the distances referred to as d and d1 are typical, and may vary widely in various antenna configurations.

Practically, there are some limitations of the actual functional circuit in FIG. 2 to cause the servo-loop to deviate somewhat from theoretical ideal. Inherently, the bandwidth of the servo-loop is limited since the system is a sampled loop and the sample rate is the EAS system's repetition rate which is under 100 HZ. Labels which are rapidly brought close to the loop antenna i.e. a running shoplifter, will cause an overshoot in the induced voltage in the label before the servo-loop reacts to reduce the output RF pulse level. Fortunately, the induced voltage at 2 feet is far less than minimum deactivation levels and 12 db to 20 db overshoot will still not result in a deactivated label.

Another theoretical limitation results from the total level control range of the variable gain amplifier 25 in FIG. 2. A 40 db control range may not be sufficient to protect some deactivatable labels from being deactivated when held within 1 inch of the loop antenna. A larger controlled amplifier range, for example 60 db, is of course possible at a higher cost allowing protection of all deactivatable labels up to and including contact with the loop antenna.

The present invention may be embodied in other specific forms without departing from the spirit and essential attributes thereof and the accordingly, reference should be made to the appended claims rather than to the foregoing specification as indicating the scope of the invention.

I claim:

1. In an electronic article surveillance system including a transmitter, a receiver and antenna means associated therewith, said transmitter, receiver and antenna means creating a detection zone, at least one detectable tag, said receiver being adapted to detect the presence of said tag within said detection zone to thereby indicate an alarm condition, wherein the improvement comprises means for reducing the output power of said transmitter in response to said receiver detecting the presence of said tag.

2. An electronic article surveillance system as claimed in claim 1 wherein said antenna means is comprised of a single antenna structure including both a transmitting antenna and a receiving antenna.

3. An electronic article surveillance system as claimed in claim 2 wherein there is a single antenna that functions as both the transmitting antenna and the receiving antenna.

4. An electronic article surveillance system as claimed in claim 2 wherein said means for reducing the output power of said transmitter reduces said power in proportion to the distance between said tag and said transmitting antenna.

5. An electronic article surveillance system as claimed in claim 2 including comparator means connected to said receiver for comparing the strength of a signal received by said receiver to a first fixed value and for indicating said alarm condition if said signal exceeds said first fixed value.

6. An electronic article surveillance system as claimed in claim 5 wherein said comparator means also compares said signal to a second fixed value and causes said reducing means to reduce the output power of said transmitter if said signal exceeds said second fixed value.

7. An electronic article surveillance system as claimed in claim 6 wherein said second fixed value is greater than said first fixed value.

8. An electronic article surveillance system as claimed in claim 7 wherein said means for reducing the output power of said transmitter reduces said power in proportion to the strength of said signal after said signal exceeds said second fixed value.

* * * * *